United States Patent
Kinukawa et al.

(10) Patent No.: US 7,154,238 B2
(45) Date of Patent: *Dec. 26, 2006

(54) SEMICONDUCTOR INTEGRATED CIRCUIT INCLUDING A MOTOR DRIVING CONTROL APPARATUS HAVING AN AMPLITUDE REGULATION CIRCUIT

(75) Inventors: Hiroki Kinukawa, Kusatsu (JP); Tatsuo Okamoto, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/251,910

(22) Filed: Oct. 18, 2005

(65) Prior Publication Data
US 2006/0038518 A1  Feb. 23, 2006

Related U.S. Application Data

(62) Division of application No. 10/870,446, filed on Jun. 18, 2004, now Pat. No. 7,002,308.

(30) Foreign Application Priority Data
Jun. 20, 2003  (JP) .............................. 2003-177353

(51) Int. Cl.
H02P 7/00 (2006.01)
H03G 3/20 (2006.01)
(52) U.S. Cl. ........................ 318/254; 318/439; 330/85; 455/234.1
(58) Field of Classification Search ...................... None
See application file for complete search history.

(56) References Cited

U.S. PATENT DOCUMENTS

| 4,812,779 A | 3/1989 | Wagner |
| 5,160,873 A | 11/1992 | Tukiyama et al. |
| 5,331,290 A | 7/1994 | Harford et al. |
| 5,552,682 A | 9/1996 | Ushikoshi |
| 5,659,230 A | 8/1997 | Fukuoka |
| 5,689,181 A | 11/1997 | Naito et al. |
| 5,812,025 A | 9/1998 | Shimazaki |
| 5,821,713 A | 10/1998 | Holling et al. |
| 5,998,946 A | 12/1999 | Kim |
| 6,686,714 B1 | 2/2004 | Trifilo |
| 6,806,663 B1 | 10/2004 | Kusaka et al. |

FOREIGN PATENT DOCUMENTS

| JP | 60-091892 | 5/1985 |
| JP | 02-188183 | 7/1990 |

*Primary Examiner*—Lincoln Donovan
*Assistant Examiner*—Eduardo Colon Santana
(74) *Attorney, Agent, or Firm*—McDermott Will & Emery LLP

(57) ABSTRACT

An amplitude regulation circuit which includes a maximum detection circuit which outputs a maximum signal MAX that is distorted to some extent during and around a time when a highest-level signal switches between signals V1, V2, and V3. The amplitude regulation circuit also includes a minimum detection circuit which outputs a minimum signal MIN that is distorted to some extent during and around a time when a lowest-level signal switches between signals V1, V2, and V3. Such distortions reduce variations in amplitude detection signal AMP that represents a difference between MAX and MIN. The amplitude regulation circuit amplifies rotor position signals H1 to H3 based on amplitude detection signal AMP according to AGC, thereby maintaining amplitudes of signals V1 to V3 constant while maintaining sinusoidal waveforms.

14 Claims, 13 Drawing Sheets

SEMICONDUCTOR INTEGRATED CIRCUIT INCLUDING A MOTOR DRIVING CONTROL APPARATUS HAVING AN AMPLITUDE REGULATION CIRCUIT

This application is a divisional of U.S. application Ser. No. 10/870,446, filed Jun. 18, 2004, now U.S. Pat. No. 7,002,308, which is based on an application No. 2003-177353 filed in Japan, the contents of which are hereby incorporated by reference.

BACKGROUND OF THE INVENTION

1. Field of the Invention

The present invention relates to an amplitude regulation circuit for regulating an amplitude of a polyphase alternating signal, and a motor driving control apparatus that uses the amplitude regulation circuit.

2. Related Art

Conventionally, brushless direct-current (DC) motors are widely used in head drums of tape recorders and for rotating storage media of disk recorders.

A typical brushless DC motor includes three coils and three Hall elements in pairs, which are arranged in a stator 120° apart in rotation angle. As a rotor rotates, the three Hall elements output three rotor position signals which are out of phase with each other by 120°.

Such a brushless DC motor is driven by a driving control apparatus which supplies currents to the coils according to reference signals that are generated by adding appropriate phase delays (e.g. 30°) to the rotor position signals.

One example of this driving control apparatus is disclosed by Japanese Patent Application Publication H02-188183.

FIG. 12 is a functional block diagram showing a driving control apparatus 9 which represents part of the disclosure of the above document that is relevant to the present invention. In the drawing, Hall elements 91 to 93 and coils 94 to 96 are part of a motor that is driven by the driving control apparatus 9.

The Hall elements 91 to 93 receive power from a power supply 90, and output rotor position signals H1 to H3 respectively. Variable gain amplifiers 21 to 23 respectively amplify rotor position signals H1 to H3 and output signals X1 to X3. Subtraction circuits 31 to 33 respectively calculate difference signals P1 to P3 which each represent a difference between two signals of adjacent phases out of signals X1 to X3. Current driving circuits 41 to 43 respectively supply currents according to difference signals P1 to P3, to the coils 94 to 96.

In this driving control apparatus 9, gains of the variable gain amplifiers 21 to 23 are automatically controlled (automatic gain control (AGC)) so that amplitudes of signals X1 to X3 are kept constant regardless of variations in factors such as Hall element characteristics, temperature, power supply, and the like. AGC makes it possible to stably drive the motor despite variations in these factors.

To do so, an absolute value addition circuit 19 adds together absolute values of signals X1 to X3, and outputs amplitude detection signal Y. A comparator 25 outputs a gain control signal to each of the variable gain amplifiers 21 to 23, based on a comparison between amplitude detection signal Y and a reference voltage generated by a reference voltage generator 26. As a result, the amplitudes of signals X1 to X3 are held constant according to the reference voltage.

FIG. 13 shows waveforms of main signals in the driving control apparatus 9. FIG. 13A shows rotor position signals H1 to H3. Rotor position signals detected by Hall elements have sinusoidal-like waveforms that vary according to a rotating magnetic field. FIG. 13B shows a signal obtained by adding together the absolute values of rotor position signals H1 to H3. This signal has a pulsating waveform (which is not observed in actual circuitry). The amplitudes of rotor position signals H1 to H3 are each limited (by AGC) at peak portions of this pulsating waveform, as a result of which distorted trapezoidal signals X1 to X3 are generated (not illustrated).

FIG. 13C shows difference signals P1 to P3 which each have a complex waveform generated by subtracting one distorted trapezoidal waveform from another.

Thus, the driving control apparatus 9 according to the conventional technique regulates rotor position signals H1 to H3 at constant amplitudes, to thereby drive the motor stably. The driving control apparatus 9, however, cannot drive the motor with low noise and low vibration. Motor noise and vibration pose significant problems especially in devices such as disk devices used for AV (audio/video) equipment and the like.

To drive the motor with low noise and low vibration, coil currents need be smoothly increased and decreased preferably in accordance with pure sinusoidal waveforms, in order to suppress unwanted torque fluctuations. The driving control apparatus 9, however, uses difference signals P1 to P3 generated from signals X1 to X3 which have distorted trapezoidal waveforms. This causes unwanted torque fluctuations.

For example, the amplitudes of signals X1 to X3 may be held constant without distorting the sinusoidal waveforms of rotor position signals H1 to H3, if amplitude detection signal Y is passed through a smoothing capacitor so as to remove a ripple.

However, when a rotation speed of the motor is low such as immediately after starting the motor or immediately before stopping the motor, a ripple frequency is as low as or even lower than 10 Hz. A large smoothing capacitor of 10 μF to 100 μF is needed to obtain a cutoff frequency that is low enough to remove such a ripple. A time required to charge such a large capacitor causes a drop in AGC responsiveness.

A well-known AGC circuit detects output signals of variable gain amplifiers, and controls gains of the variable gain amplifiers according to a control voltage obtained by smoothing the detected signals using a smoothing capacitor. In this case too, a ripple in the control signal when the motor rotation speed is low such as immediately after starting the motor or immediately before stopping the motor causes distortions in outputs of the variable gain amplifiers, with it being impossible to drive a motor stably. A large smoothing capacitor of 10 μF to 100 μF is needed to remove such a ripple at low motor rotation speed. The use of a large smoothing capacitor, however, leads to a drop in responsiveness when the motor rotation speed varies or when the detected signals change. Hence it is still impossible to reduce signal distortions when the motor rotation speed is low, while maintaining high AGC responsiveness.

SUMMARY OF THE INVENTION

In view of the above problems, the present invention aims to provide an amplitude regulation circuit and method that prevent signal distortions when the motor rotation speed is low while maintaining high AGC responsiveness, and a motor driving control apparatus and method that use the amplitude regulation circuit and method.

The stated aim can be achieved by an amplitude regulation circuit for regulating a signal of each of a plurality of phases in a polyphase alternating signal at a constant amplitude, and outputting the regulated signal, including: variable gain amplifiers corresponding one-to-one with the plurality of phases, each of the variable gain amplifiers being operable to amplify a signal of a corresponding phase using a gain controlled by a control signal, and output the amplified signal; a maximum detection unit operable to output a maximum signal, based on an amplified signal having a highest level out of amplified signals which are output from the variable gain amplifiers; a minimum detection unit operable to output a minimum signal, based on an amplified signal having a lowest level out of the amplified signals; and a control signal generation unit operable to output, to each of the variable gain amplifiers, a control signal for decreasing the gain when a difference between the maximum signal and the minimum signal is greater than a predetermined reference value, and a control signal for increasing the gain when the difference is no greater than the predetermined reference value.

According to this construction, the difference between the maximum signal and the minimum signal is detected as the DC control signal that is proportional to the amplitude of the signal of each of the plurality of phases, and the gain of each of the variable gain amplifiers is controlled to keep the level of the control signal constant. In actual circuitry, the maximum signal distorts to some extent during and around a time when the highest-level amplified signal switches between the amplified signals, and the minimum signal distorts to some extent during and around a time when the lowest-level amplified signal switches between the amplified signals. Such distortions serve to reduce variations of the difference between the maximum signal and the minimum signal. As a result, variations in the control signal output to the variable gain amplifiers are reduced. This allows the variable gain amplifiers to produce amplified signals with little distortion. Since this amplitude regulation circuit does not include a smoothing capacitor, high AGC responsiveness is maintained.

Here, the maximum detection unit may include: a constant current source; and NPN transistors corresponding one-to-one with the plurality of phases, each of the NPN transistors having a base in which an amplified signal output from a variable gain amplifier of a corresponding phase is input, and an emitter which is connected to the constant current source via an individual resistor, wherein the maximum detection unit outputs the maximum signal from a connection point between the constant current source and resistors corresponding to the NPN transistors, the minimum detection unit includes: a constant current source; and PNP transistors corresponding one-to-one with the plurality of phases, each of the PNP transistors having a base in which an amplified signal output from a variable gain amplifier of a corresponding phase is input, and an emitter which is connected to the constant current source via an individual resistor, and the minimum detection unit outputs the minimum signal from a connection point between the constant current source and resistors corresponding to the PNP transistors.

According to this construction, the distortions of the maximum signal and the minimum signal can be controlled using resistors. Accordingly, by employing resistors having optimum resistances based on the amplified signals of the variable gain amplifiers, distortions in amplified signals of the variable gain amplifiers can be minimized.

Here, the maximum detection unit may include: a constant current source; and N-channel MOSFETs corresponding one-to-one with the plurality of phases, each of the N-channel MOSFETS having a gate in which an amplified signal output from a variable gain amplifier of a corresponding phase is input, and a source which is connected to the constant current source, wherein the maximum detection unit outputs the maximum signal from a connection point between the constant current source and sources of the N-channel MOSFETS, the minimum detection unit includes: a constant current source; and P-channel MOSFETs corresponding one-to-one with the plurality of phases, each of the P-channel MOSFETs having a gate in which an amplified signal output from a variable gain amplifier of a corresponding phase is input, and a source which is connected to the constant current source, and the minimum detection unit outputs the minimum signal from a connection point between the constant current source and sources of the P-channel MOSFETs.

According to this construction, the distortions of the maximum signal and the minimum signal can be controlled using characteristics of MOSFETS. Accordingly, by employing MOSFETs having optimum gate lengths and gate widths based on the amplified signals of the variable gain amplifiers, distortions in amplified signals of the variable gain amplifiers can be minimized.

The stated aim can also be achieved by an amplitude regulation circuit for regulating a signal of each of a plurality of phases in a polyphase alternating signal at a constant amplitude, and outputting the regulated signal, including: variable gain amplifiers corresponding one-to-one with the plurality of phases, each of the variable gain amplifiers being operable to amplify a signal of a corresponding phase using a gain controlled by a control signal, and output the amplified signal; square units corresponding one-to-one with the plurality of phases, each of the square units being operable to square an amplified signal output from a variable gain amplifier of a corresponding phase, and output the squared signal; an addition unit operable to calculate a sum of squared signals output from the square units, and output the sum as a square sum signal; and a control signal generation unit operable to output, to each of the variable gain amplifiers, a control signal for decreasing the gain when the square sum signal is greater than a predetermined reference value, and a control signal for increasing the gain when the square sum signal is no greater than the predetermined reference value.

According to this construction, the sum of squares of the amplified signals output from the variable gain amplifiers is detected as the DC control signal that is proportional to the amplitude of the signal of each of the plurality of phases, and the gain of each of the variable gain amplifiers is controlled to keep the level of the control signal constant. Since a sum of squares of pure sinusoidal waves of a plurality of phases is a constant that is proportional to an amplitude, in principle the gain is controlled by the ideal control signal which contains no ripple. This allows the variable gain amplifiers to produce undistorted outputs. This amplitude regulation circuit can generate the DC control signal for AGC without using a smoothing capacitor, so that high AGC responsiveness is maintained.

The stated aim can also be achieved by a motor driving control apparatus for driving a brushless motor that includes coils corresponding to a plurality of phases, based on Hall signals showing rotor positions, including: the above amplitude regulation circuit operable to regulate each of the Hall signals at a constant amplitude and output the regulated signals; and a reference signal generation unit operable to generate a reference signal showing a voltage or current to be supplied to a coil corresponding to each of the plurality of phases, from the regulated signals.

Here, the motor driving control apparatus may further include: a driving unit operable to supply the voltage or current shown by the reference signal to the coil corresponding to each of the plurality of phases.

The stated aim can also be achieved by a motor driving control apparatus for driving a brushless motor that includes coils corresponding to a plurality of phases, based on Hall signals showing rotor positions, including: an amplitude regulation circuit which (a) includes variable gain amplifiers that are operable to amplify the Hall signals in a one-to-one correspondence and output the amplified signals, and (b) is operable to regulate each of the Hall signals at a constant amplitude and output the regulated signals, by controlling a gain of each of the variable gain amplifiers based on a difference in level between an amplified signal having a highest level and an amplified signal having a lowest level out of the amplified signals; a reference signal generation unit operable to generate a reference signal showing a voltage or current to be supplied to a coil corresponding to each of the plurality of phases, from the regulated signals; and a driving circuit operable to drive the coil corresponding to each of the plurality of phases based on the reference signal.

Here, the driving circuit may drive the coil corresponding to each of the plurality of phases, by outputting to the coil a PWM signal whose pulse width is modulated according to a waveform of the reference signal.

The stated aim can also be achieved by a semiconductor integrated circuit device including the above motor driving control apparatus.

According to these constructions, the amplitude regulation circuit outputs the Hall signals which are regulated at constant amplitudes. By using such regulated Hall signals themselves or signals obtained by simply shifting the regulated Hall signals in phase as reference signals, smoothly changing driving currents can be generated. This motor driving control apparatus can be realized with a simple construction, and drive the brushless motor with low vibration. Since it is unnecessary to smooth the control signal for AGC, high AGC responsiveness is maintained in a wide range of motor rotation speeds.

Also, by driving each coil according to PWM, a high power supply efficiency is achieved.

Furthermore, the following effects can be produced if the reference signals are generated based on phase information obtained from the regulated Hall signals. In general, Hall signals detected by Hall elements vary in amplitude due to factors such as manufacturing variations and ambient temperatures. This being so, in the absence of an amplitude regulation circuit, the phase detection accuracy decreases relatively when the Hall signals decrease in amplitude. Even if a conventional AGC circuit is used to remedy this, a ripple in AGC control signal increases when the motor rotation speed is low, which distorts position signals obtained as a result of AGC. Thus, the phase detection accuracy when the motor rotation speed is low cannot be improved. According to the above construction, however, the position signals output from the amplitude regulation circuit are kept at constant amplitudes with little distortion even when the Hall signals vary in amplitude. Accordingly, high phase detection accuracy is maintained. As a result, accurate reference signals are generated even when the motor rotation speed is low, with it being possible to drive the motor favorably.

The stated aim can also be achieved by an amplitude regulation method for regulating a signal of each of a plurality of phases in a polyphase alternating signal at a constant amplitude, and outputting the regulated signal, including: a variable gain amplification step of amplifying the signal of each of the plurality of phases using a variable gain, and outputting the amplified signal; a maximum detection step of outputting a maximum signal, based on an amplified signal having a highest level out of amplified signals which are output in the variable gain amplification step; a minimum detection step of outputting a minimum signal, based on an amplified signal having a lowest level out of the amplified signals; and a gain control step of decreasing the gain when a difference between the maximum signal and the minimum signal is greater than a predetermined reference value, and increasing the gain when the difference is no greater than the predetermined reference value.

According to this method, the difference between the maximum signal and the minimum signal is detected as the DC control signal that is proportional to the amplitude of the signal of each of the plurality of phases, and the gain in the variable gain amplification step is controlled to keep the level of the control signal constant. When actually implementing this method, the maximum signal distorts to some extent during and around a time when the highest-level amplified signal switches between the amplified signals, and the minimum signal distorts to some extent during and around a time when the lowest-level amplified signal switches between the amplified signals. Such distortions serve to reduce variations of the difference between the maximum signal and the minimum signal. As a result, variations in the control signal output in the gain control step are reduced. This makes it possible to produce amplified signals with little distortion.

Here, when a difference in level between the highest-level amplified signal and an amplified signal having a second highest level out of the amplified signals is smaller than a predetermined threshold value, the maximum detection step may weight each of the levels of the highest-level amplified signal and the second-highest-level amplified signal according to the difference, and output a sum of the weighted levels as the maximum signal, wherein when a difference in level between the lowest-level amplified signal and an amplified signal having a second lowest level out of the amplified signals is smaller than a predetermined threshold value, the minimum detection step weights each of the levels of the lowest-level amplified signal and the second-lowest-level amplified signal according to the difference, and outputs a sum of the weighted levels as the minimum signal.

According to this method, the maximum signal is distorted during and around a time when the highest-level amplified signal switches between the amplified signals, and the minimum signal is distorted during and around a time when the lowest-level amplified signal switches between the amplified signals. In this way, distortions in amplified signals can be minimized.

The stated aim can also be achieved by an amplitude regulation method for regulating a signal of each of a plurality of phases in a polyphase alternating signal at a constant amplitude, and outputting the regulated signal, including: a variable gain amplification step of amplifying the signal of each of the plurality of phases using a variable gain, and outputting the amplified signal; a square step of squaring each of amplified signals output in the variable gain amplification step, and outputting the squared signals; an addition step of calculating a sum of the squared signals output in the square step, and outputting the sum as a square sum signal; and a gain control step of decreasing the gain when the square sum signal is greater than a predetermined reference value, and increasing the gain when the square sum signal is no greater than the predetermined reference value.

According to this method, the sum of squares of the amplified signals output in the variable gain amplification step is detected as the DC control signal that is proportional to the amplitude of the signal of each of the plurality of phases, and the gain is controlled to keep the level of the control signal constant. Since a sum of squares of pure sinusoidal waves of a plurality of phases is a constant that is proportional to an amplitude, in principle the gain is controlled by the ideal control signal which contains no ripple. This makes it possible to produce undistorted outputs.

The stated aim can also be achieved by a motor driving control method for driving a brushless motor that includes coils corresponding to a plurality of phases, based on Hall signals showing rotor positions, including: an amplitude regulation step of regulating each of the Hall signals at a constant amplitude and outputting the regulated signals, by using the above amplitude regulation method; and a reference signal generation step of generating a reference signal showing a voltage or current to be supplied to a coil corresponding to each of the plurality of phases, from the regulated signals.

Here, the motor driving control method may further include: a driving step of supplying the voltage or current shown by the reference signal to the coil corresponding to each of the plurality of phases.

By driving the motor according to these methods, the same effects as the above motor driving control apparatuses can be achieved.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

First Embodiment

The following describes a driving control apparatus for a three-phase brushless DC motor in the first embodiment of the invention, with reference to drawings. This driving control apparatus includes an amplitude regulation circuit for regulating Hall signals showing rotor positions of the motor (hereafter referred to as "rotor position signals") at constant amplitudes, and controls power to the motor based on the regulated rotor position signals. A constant amplitude referred to here is an amplitude which, although containing minute variations that may be used for amplitude regulation, can practically be considered constant when driving a motor. Also, rotor position signals obtained using Hall elements have sinusoidal-like waveforms that vary according to a rotating magnetic field, as explained earlier in the Related Art section.

(Overall Construction)

Figure 1:
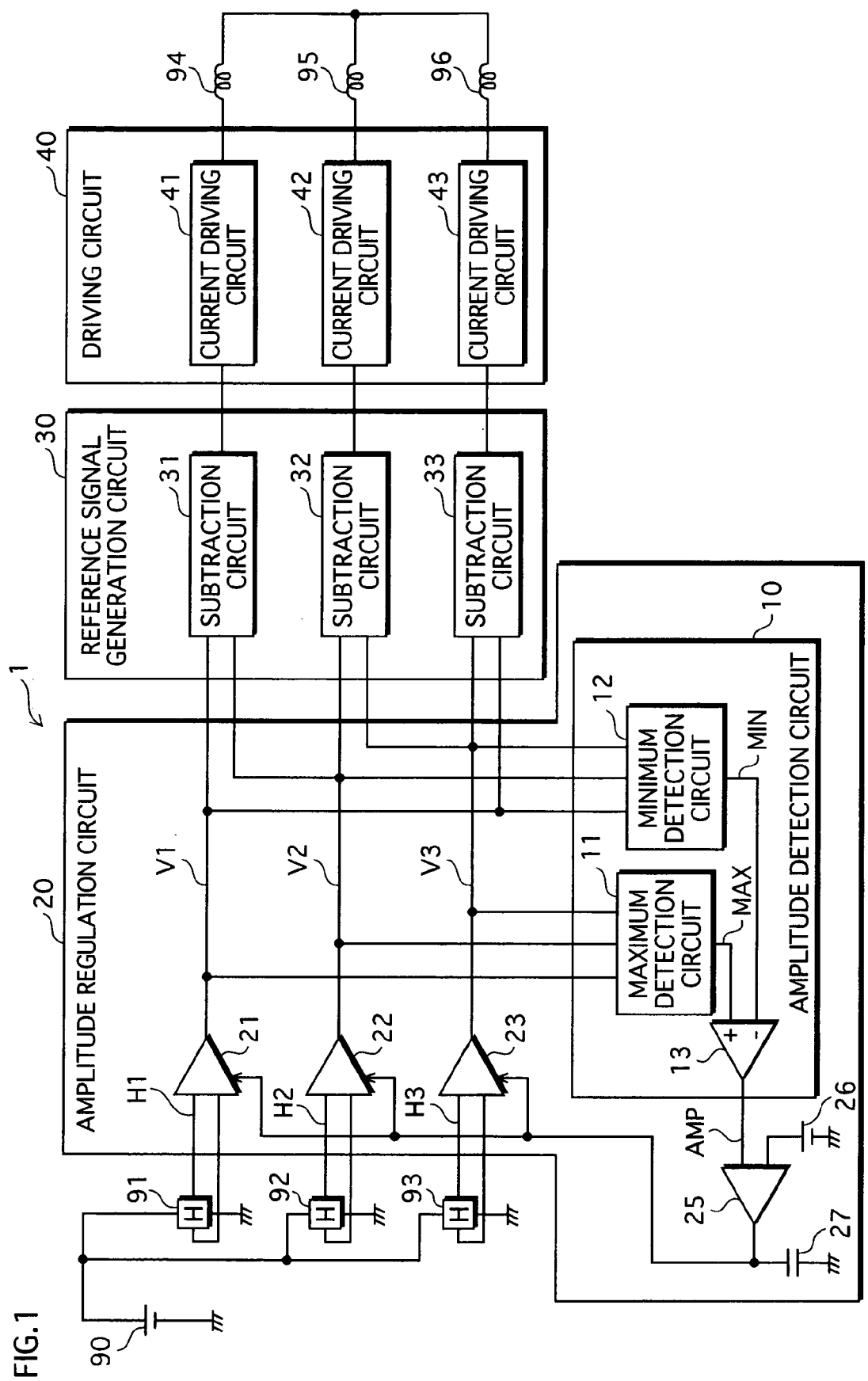
FIG. 1 is a functional block diagram showing a driving control apparatus in the first embodiment of the invention.

FIG. 1 is a functional block diagram showing a driving control apparatus 1 for a three-phase brushless DC motor, together with the motor driven by the driving control apparatus 1. In the drawing, construction elements which are the same as those in the driving control apparatus 9 described in the Related Art section have been given the same reference numerals. As can be seen from the drawings, the driving control apparatus 1 differs from the driving control apparatus 9 in a construction of generating a control signal for regulating the amplitudes of rotor position signals H1 to H3.

In the driving control apparatus 1, the variable gain amplifiers 21 to 23, an amplitude detection circuit 10, the comparator 25, the reference voltage generator 26, and a phase compensation capacitor 27 constitute an amplitude regulation circuit 20. The amplitude regulation circuit 20 amplifies rotor position signals H1 to H3, using a gain which is controlled so as to hold the amplitudes of output signals constant.

Hereafter, the subtraction circuits 31 to 33 are collectively called a reference signal generation circuit 30 and the current driving circuits 41 to 43 are collectively called a driving circuit 40, for ease of explanation. The power supply 90, the Hall elements 91 to 93, and the coils 94 to 96 are part of the motor and are not included in the driving control apparatus 1.

(Amplitude Detection Circuit 10)

The amplitude detection circuit 10 is realized without a smoothing capacitor. The amplitude detection circuit 10 outputs a control signal for gain control (amplitude detection signal AMP) with a significantly smaller amount of ripple than in conventional techniques, while maintaining high AGC responsiveness. This is achieved by the following construction.

Figure 2:
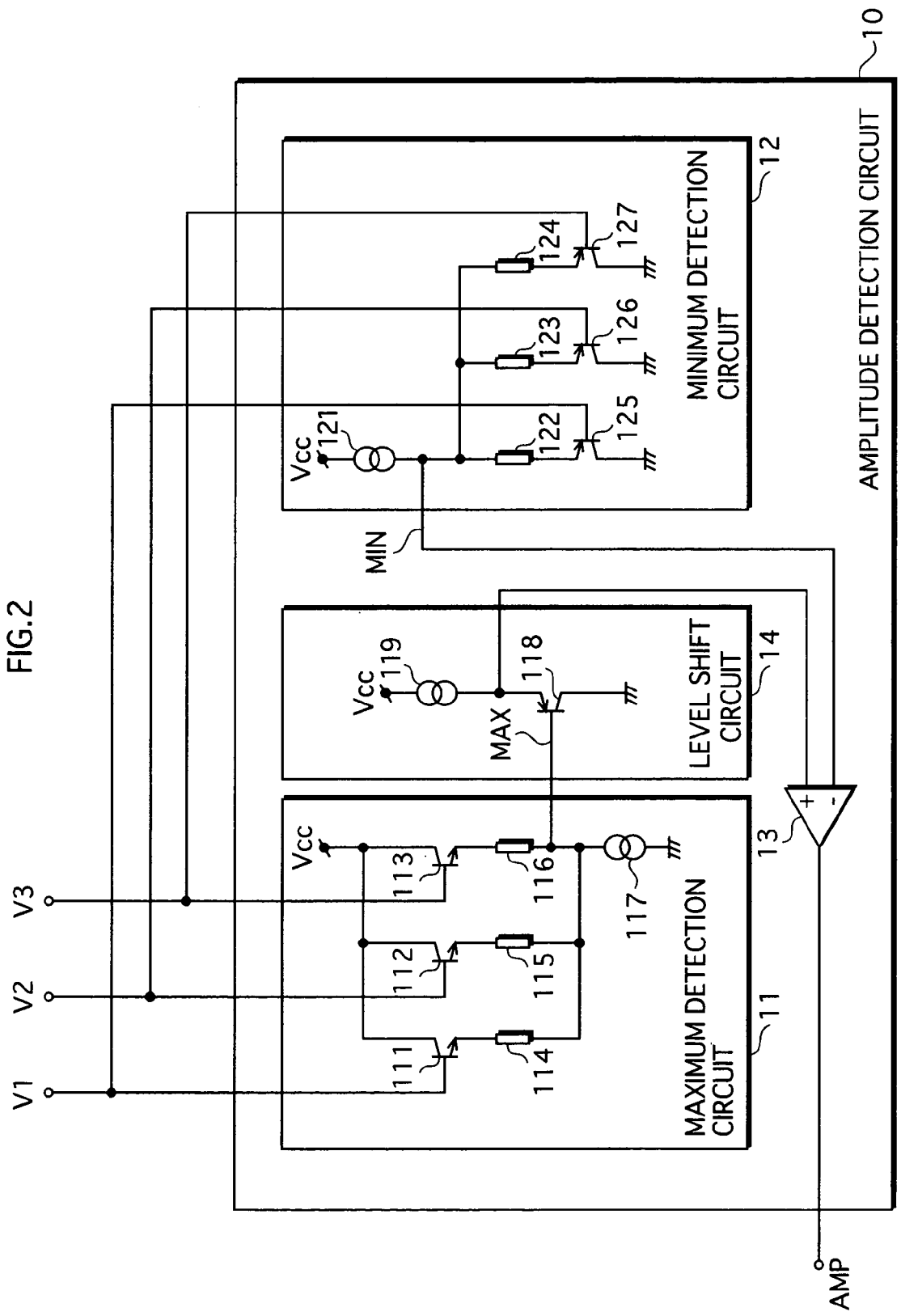
FIG. 2 is an equivalent circuit diagram showing an amplitude detection circuit in the first embodiment.

FIG. 2 is an equivalent circuit diagram showing a detailed construction of the amplitude detection circuit 10.

The amplitude detection circuit 10 includes a maximum detection circuit 11, a minimum detection circuit 12, a level shift circuit 14, and a subtractor 13.

The maximum detection circuit 11 includes a constant current source 117, NPN transistors 111 to 113, and resistors 114 to 116. Signals V1 to V3 output from the variable gain amplifiers 21 to 23 are input in bases of the NPN transistors 111 to 113 respectively. Meanwhile, emitters of the NPN transistors 111 to 113 are connected to the constant current source 117 via the resistors 114 to 116 respectively. The maximum detection circuit 11 outputs maximum signal MAX from a connection point between each of the resistors 114 to 116 and the constant current source 117.

The level shift circuit 14 includes a PNP transistor 118 and a constant current source 119. The PNP transistor 118 and the constant current source 119 shift up the level of maximum signal MAX.

The minimum detection circuit 12 includes a constant current source 121, PNP transistors 125 to 127, and resistors 122 to 124. Signals V1 to V3 output from the variable gain amplifiers 21 to 23 are input in bases of the PNP transistors 125 to 127 respectively. Meanwhile, emitters of the PNP transistors 125 to 127 are connected to the constant current source 121 via the resistors 122 to 124 respectively. The minimum detection circuit 12 outputs minimum signal MIN from a connection point between each of the resistors 122 to 124 and the constant current source 121.

The subtractor 13 calculates a difference between level-shifted maximum signal MAX and minimum signal MIN, and outputs the difference as amplitude detection signal AMP. Amplitude detection signal AMP is fed to the variable gain amplifiers 21 to 23 as a control signal for gain control.

Figure 3:
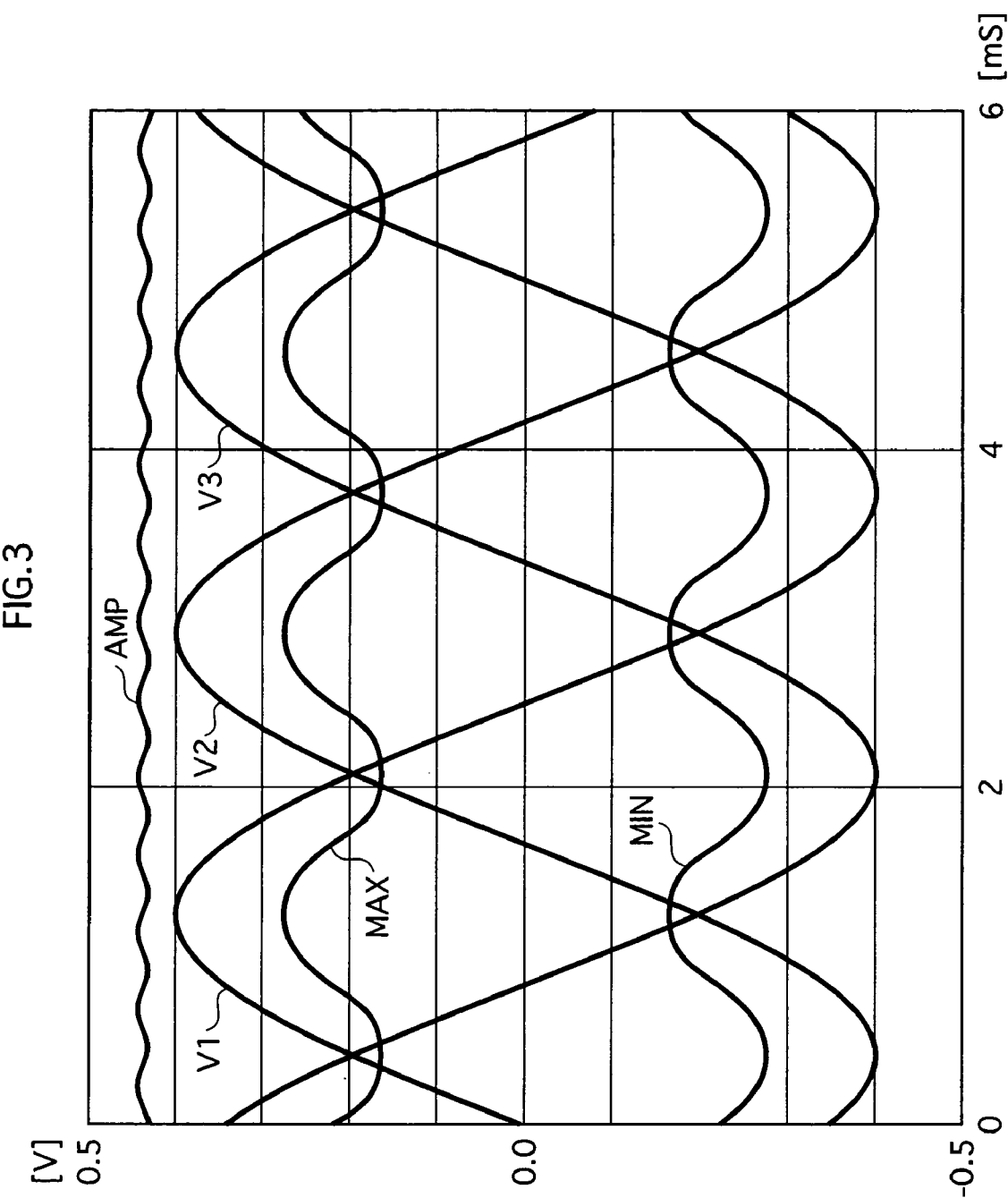
FIG. 3 shows waveforms of main signals in the amplitude detection circuit shown in FIG. 2.

FIG. 3 shows waveforms of main signals in the amplitude detection circuit 10. These waveforms are based on a result of a simulation that was conducted under the following conditions: the resistors 114 to 116 and 122 to 124 each have a resistance of 5.2 KΩ; the constant current sources 117 and 121 each have a current of 25 μA; and signals V1 to V3 each have an amplitude of 800 mVp-p and a frequency of 200 Hz.

FIG. 3 shows each signal which has been level-shifted. Such level shifts are designed as necessary, to achieve favorable results. A circuit such as the level shift circuit 14 shown in FIG. 2 can be used to actually level-shift a signal.

As shown in FIG. 3, maximum signal MAX has a waveform in which a rate of change is diffused during and around a time when a highest-level signal switches between signals V1, V2, and V3, due to effects of the resistors 114 to 116. In other words, maximum signal MAX has a waveform which is distorted during and around a time when a highest-level signal switches between signals V1, V2, and V3. Likewise, minimum signal MIN has a waveform which is distorted during and around a time when a lowest-level signal switches between signals V1, V2, and V3. As can be understood from the drawing, these distortions serve to reduce variations in amplitude detection signal AMP that shows a difference between maximum signal MAX and minimum signal MIN.

The result of the simulation indicates that amplitude detection signal AMP has a maximum voltage of 439 mV and a minimum voltage of 430 mV. Suppose a ripple contained in a signal is evaluated by (amplitude variation)/(average voltage). This being so, (439 mV–430 mV)/((439 mV+430 mV)/2), so that amplitude detection signal AMP contains a ripple of about 2%.

(Effect of the Resistors in the Maximum Detection Circuit 11)

The rate of change of maximum signal MAX during and around a time when a highest-level signal switches between signals V1 and V2 is diffused by the resistors 114 and 115, in the following manner.

Figure 4:
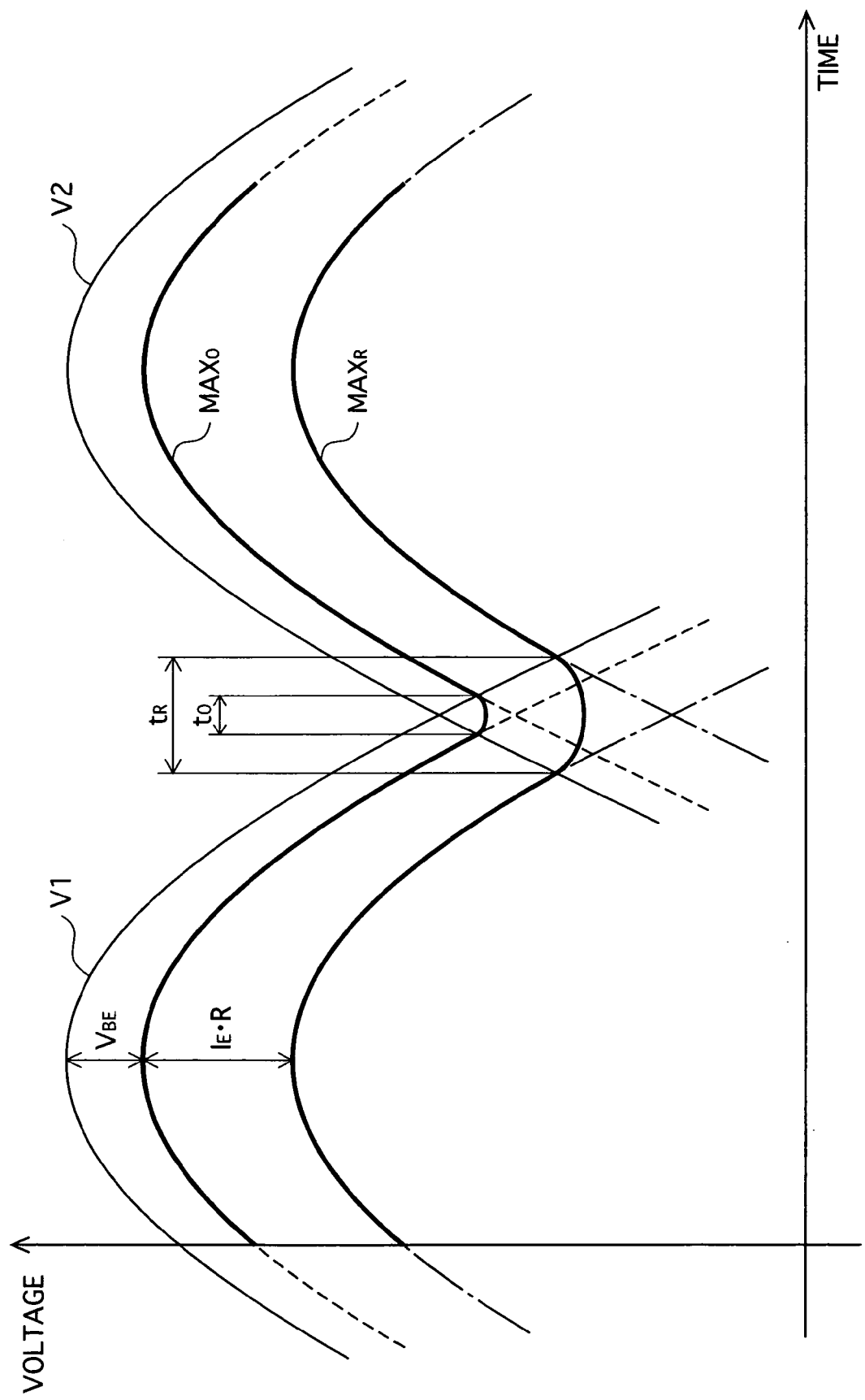
FIG. 4 shows waveforms of signals to illustrate effects of resistors provided in a maximum detection circuit in the amplitude detection circuit.

FIG. 4 shows a waveform of maximum signal $MAX_R$ where the resistors 114 and 115 are present. For comparison, the drawing also shows maximum signal $MAX_0$ where the resistors 114 and 115 are not present (i.e. 0 Ω in resistance).

(1) When V2 is sufficiently lower than V1, the NPN transistor 111 (hereafter "Tr 111") is ON whereas the NPN transistor 112 (hereafter "Tr 112") is OFF. Accordingly, maximum signal $MAX_R$ is $V1-(V_{BE}+I_E \cdot R)$, that is, a voltage obtained by subtracting voltage $V_{BE}$ between the base and emitter of the Tr 111 and voltage $I_E \cdot R$ at the resistor 114 from V1.

(2) When V2 becomes higher than $V1-I_E \cdot R$, an emitter current of the Tr 112 begins to flow whereas an emitter current of the Tr 111 supplied from the same constant current source 117 begins to drop. As V2 increases, $(V_{BE}+I_E \cdot R)$ relating to the Tr 111 decreases whilst $(V_{BE}+I_E \cdot R)$ relating to the Tr 112 increases. Accordingly, maximum signal $MAX_R$ is a voltage obtained by weighting each of V1 and V2 according to a difference between V1 and V2 and adding together weighted V1 and V2.

(3) After this, when V1 becomes lower than $V2-(I_E \cdot R)$, the Tr 111 becomes completely OFF. Hence maximum signal $MAX_R$ is $V2-(V_{BE}+I_E \cdot R)$.

Thus, when the difference in level between V1 and V2 is equal to or greater than a threshold value ($I_E \cdot R$ in this example) which depends on a resistance, only one transistor corresponding to a signal having a higher level out of V1 and V2 is ON. Accordingly, maximum signal $MAX_R$ changes along that signal. When the difference between V1 and V2 becomes smaller than the threshold value, both transistors corresponding to V1 and V2 are ON. During this time, maximum signal $MAX_R$ is a voltage obtained by weighting each of V1 and V2 according to the difference between V1 and V2 and adding together weighted V1 and V2. Hence maximum signal $MAX_R$ smoothly shifts from a waveform which changes along V1 to a waveform which changes along V2.

If the resistors 114 and 115 are not present ($MAX_0$), on the other hand, the threshold value is $V_{BE}$.

A time period during which both transistors are ON is hereafter called a transition period. In FIG. 4, $t_R$ denotes a transition period in the case where the resistors 114 and 115 are present, whereas $t_0$ denotes a transition period in the case where the resistors 114 and 115 are not present. As shown in the drawing, $t_0 < t_R$. If the resistance is larger, the threshold value is higher, as a result of which the transition period extends. Hence the rate of change of maximum signal $MAX_R$ can be further diffused.

The same applies to maximum signal MAX when a highest-level signal switches from V2 to V3 or from V3 to V1, and to minimum signal MIN.

(Conclusion on the First Embodiment)

As described above, a ripple in amplitude detection signal AMP can be reduced to about 2% through the use of the amplitude detection circuit 10.

A ripple in a conventional amplitude detection signal which is generated by adding together absolute values of pure sinusoidal waves of three phases is, when evaluated by (amplitude variation)/(average voltage), about 14%. Thus, the amplitude detection circuit 10 achieves a significant reduction in ripple when compared with conventional techniques.

The amplitude regulation circuit 20 regulates the amplitudes of rotor position signals H1 to H3 using such amplitude detection signal AMP as a control signal for gain control. This makes it possible to generate signals V1 to V3 of constant amplitudes with almost no ripple, while maintaining sinusoidal waveforms. Since amplitude detection signal AMP is generated without using a smoothing capacitor, high AGC responsiveness can be maintained.

The subtraction circuits 31 to 33 in the reference signal generation circuit 30 function as phase shifters. The subtraction circuits 31 to 33 each perform a simple subtraction on two out of signals V1 to V3, thereby generating reference signals of desirable phases showing currents to be supplied to the coils 94 to 96. The subtraction circuits 31 to 33 can be omitted if the coils 94 to 96 and the Hall elements 91 to 93 have appropriate positioning. In such a case, signals V1 to V3 output from the amplitude regulation circuit 20 can be used as the reference signals.

The driving circuit 40 supplies the currents shown by the reference signals to the coils 94 to 96. This construction can be modified such that the reference signals show voltages to be supplied to the coils 94 to 96 and the driving circuit 40 drives the coils 94 to 96 by voltage.

Second Embodiment

A driving control apparatus of the second embodiment of the invention has a same overall construction as that of the first embodiment (see FIG. 1), but differs in a construction of an amplitude detection circuit. The following describes an amplitude detection circuit of the second embodiment in detail.

(Amplitude Detection Circuit 15)

Figure 5:
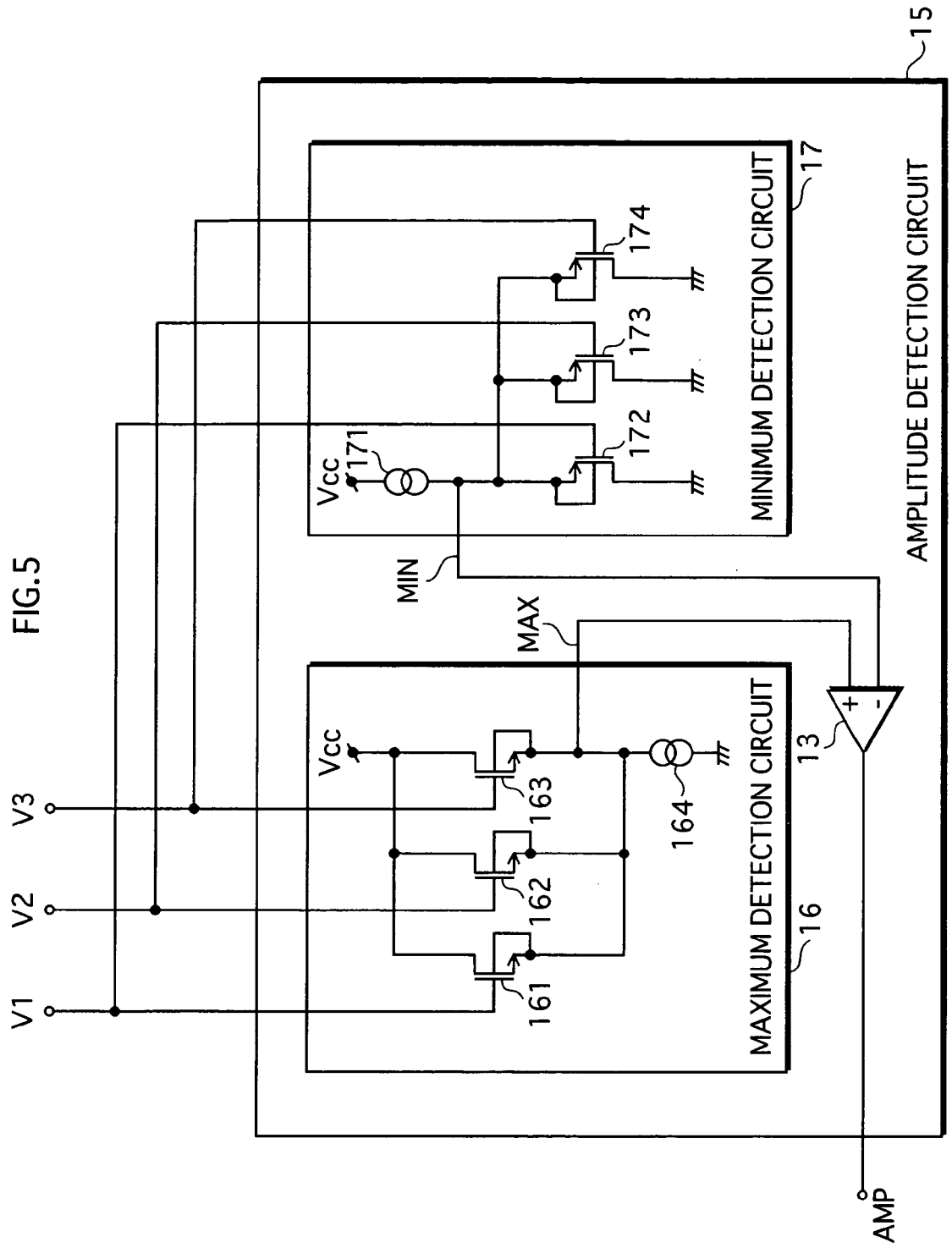
FIG. 5 is an equivalent circuit diagram showing an amplitude detection circuit in the second embodiment of the invention.

FIG. 5 is an equivalent circuit diagram showing a detailed construction of an amplitude detection circuit 15 of the second embodiment. Note here that construction elements which are the same as those in the amplitude detection circuit 10 of the first embodiment have been given the same reference numerals.

Like the amplitude detection circuit 10, the amplitude detection circuit 15 generates amplitude detection signal AMP based on a difference between maximum signal MAX and minimum signal MIN. While the amplitude detection circuit 10 is provided with NPN transistors and PNP transistors, however, the amplitude detection circuit 15 is provided with MOSFETs (metal oxide semiconductor field effect transistors).

The amplitude detection circuit 15 includes a maximum detection circuit 16, a minimum detection circuit 17, and the subtractor 13.

The maximum detection circuit 16 includes a constant current source 164 and N-channel MOSFETs 161 to 163. Signals V1 to V3 output from the variable gain amplifiers 21 to 23 are input respectively in gates of the N-channel MOSFETs 161 to 163. Meanwhile, sources of the N-channel MOSFETs 161 to 163 are connected to the constant current source 164. The maximum detection circuit 16 outputs maximum signal MAX from a connection point between each of the sources of the N-channel MOSFETs 161 to 163 and the constant current source 164.

The minimum detection circuit 17 includes a constant current source 171 and P-channel MOSFETs 172 to 174. Signals V1 to V3 output from the variable gain amplifiers 21 to 23 are input respectively in gates of the P-channel MOSFETs 172 to 174. Meanwhile, sources of the P-channel MOSFETs 172 to 174 are connected to the constant current source 171. The minimum detection circuit 17 outputs minimum signal MIN from a connection point between each of the sources of the P-channel MOSFETs 172 to 174 and the constant current source 171.

The subtractor 13 calculates a difference between maximum signal MAX and minimum signal MIN, and outputs the difference as amplitude detection signal AMP.

Figure 6:
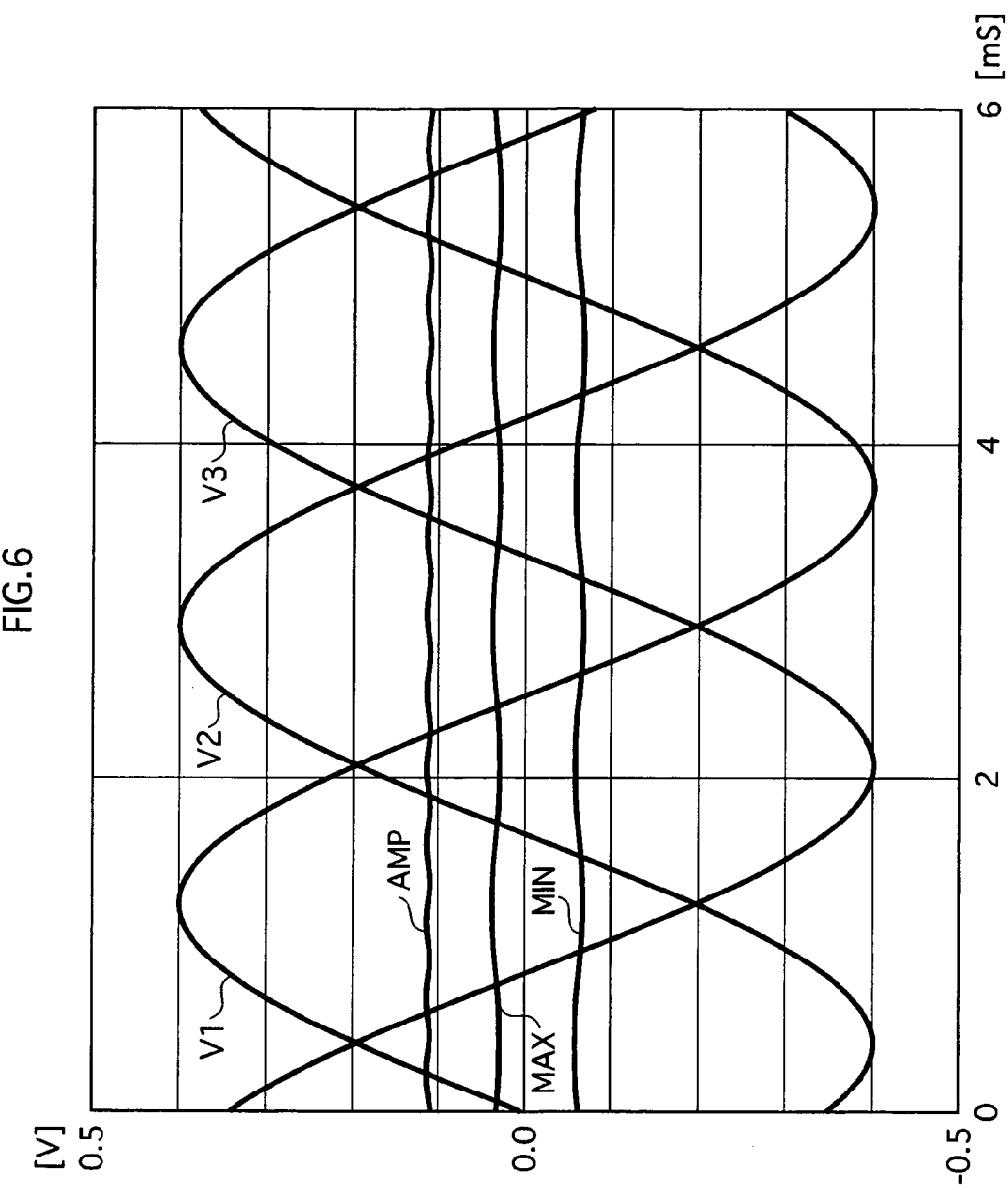
FIG. 6 shows waveforms of main signals in the amplitude detection circuit shown in FIG. 5.

FIG. 6 shows waveforms of main signals in the amplitude detection circuit 15. These waveforms are based on a result of a simulation which was conducted under the following conditions: the constant current sources 164 and 171 each have a current of 25 µA; signals V1 to V3 each have an amplitude of 800 mVp-p and a frequency of 200 Hz; the N-channel MOSFETs 161 to 163 each have a gate length of 3 µm and a gate width of 1.5 µm; and the P-channel MOSFETs 172 to 174 each have a gate length of 3 µm and a gate width of 4.5 µm.

FIG. 6 shows each signal which has been level-shifted as necessary, as in the first embodiment.

As shown in the drawing, maximum signal MAX has a waveform in which a rate of change is diffused during and around a time when a highest-level signal switches between signals V1, V2, and V3, due to nonlinear (square) characteristics of MOSFETs. Likewise, minimum signal MIN has a waveform in which a rate of change is diffused during and around a time when a lowest-level signal switches between signals V1, V2, and V3. The result of the simulation indicates that amplitude detection signal AMP has an average voltage of 105 mV and contains a ripple of about 0.8%.

(Conclusion on the Second Embodiment)

As described above, a ripple in amplitude detection signal AMP can be reduced to about 0.8% through the use of the amplitude detection circuit 15.

Both the maximum detection circuit 16 and the minimum detection circuit 17 in the amplitude detection circuit 15 do not include resistors, and have a construction typical to circuitry of a similar kind. Nevertheless, a ripple reduction is achieved by making use of nonlinear characteristics of N-channel MOSFETs and P-channel MOSFETs.

By regulating the amplitudes of rotor position signals H1 to H3 using such amplitude detection signal AMP, signals V1 to V3 of constant amplitudes with almost no ripple are generated while maintaining sinusoidal waveforms, as in the first embodiment. Since amplitude detection signal AMP is generated without using a smoothing capacitor, high AGC responsiveness can be maintained as in the first embodiment.

Third Embodiment

A driving control apparatus of the third embodiment of the invention differs from that of the first embodiment in a construction of an amplitude detection circuit.

Figure 7:
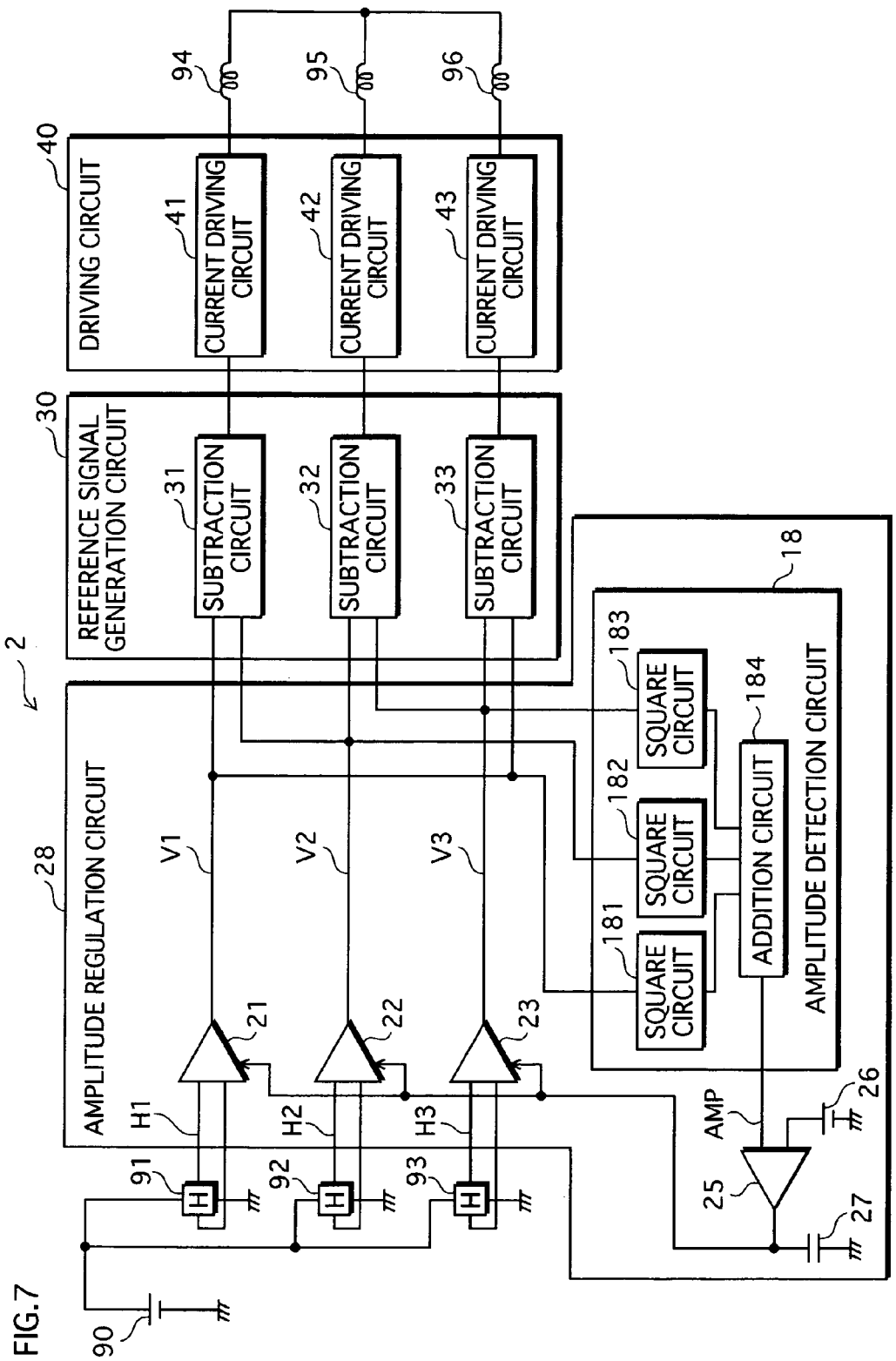
FIG. 7 is a functional block diagram showing a driving control apparatus in the third embodiment of the invention.

FIG. 7 is a functional block diagram showing a driving control apparatus 2 of the third embodiment together with part of a motor driven by the driving control apparatus 2. In the drawing, construction elements which are the same as those in the driving control apparatus 1 of the first embodiment have been given the same reference numerals and their explanation has been omitted.

(Amplitude Detection Circuit 18)

An amplitude detection circuit 18 includes square circuits 181 to 183 and an addition circuit 184. The amplitude detection circuit 18 outputs a sum of squares of signals V1 to V3 output from the variable gain amplifiers 21 to 23, as amplitude detection signal AMP.

A sum of squares of pure sinusoidal waves of three phases is a constant that is proportional to an amplitude of the pure sinusoidal waves, and rotor position signals H1 to H3 are sinusoidal waves of three phases. Therefore, an ideal signal that is proportional to the amplitude of rotor position signals H1 to H3 and contains almost no ripple can be obtained as amplitude detection signal AMP.

Figure 8:
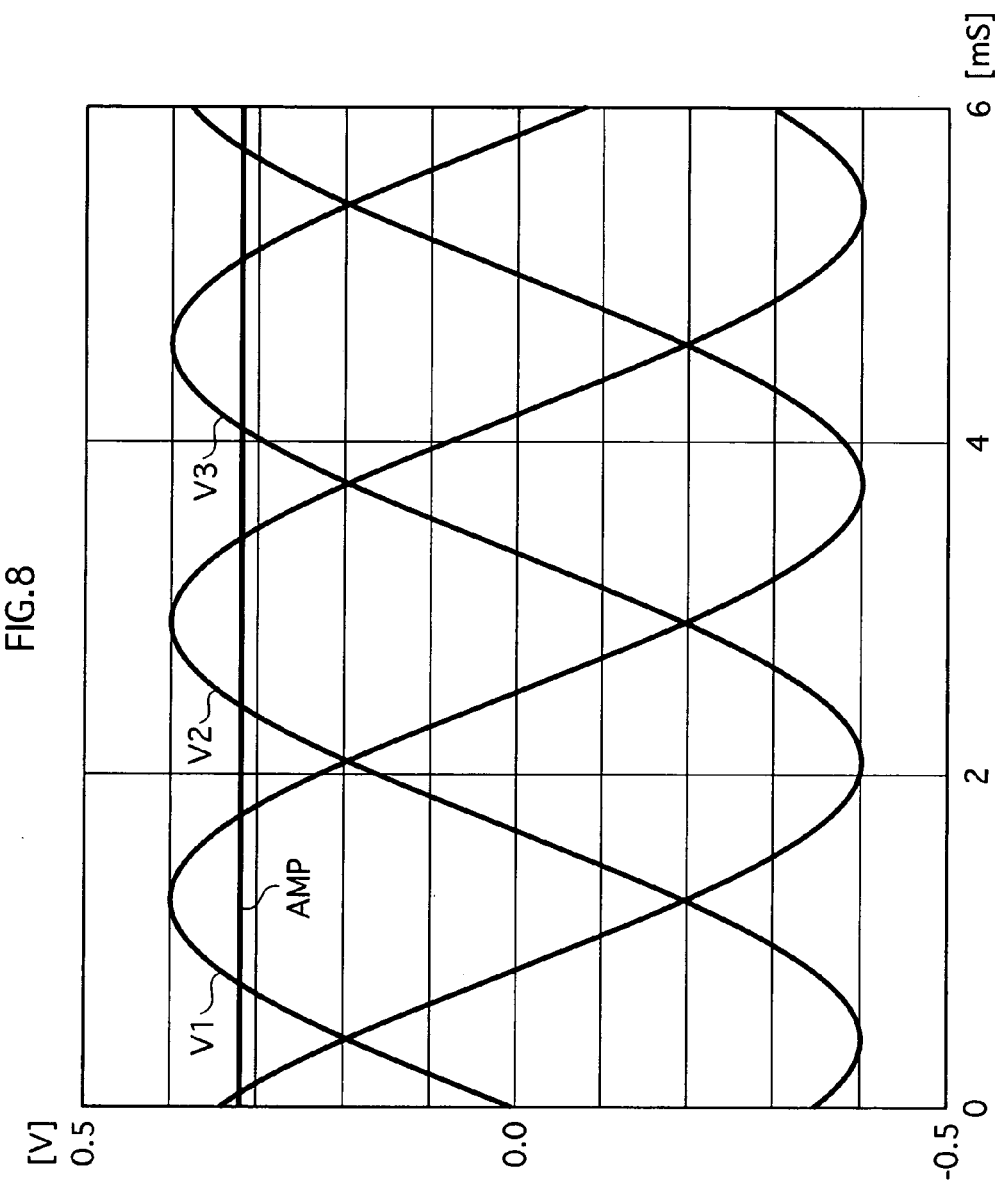
FIG. 8 shows waveforms of main signals in an amplitude detection circuit in the driving control apparatus shown in FIG. 7.

FIG. 8 shows waveforms of main signals in the amplitude detection circuit 18. Since amplitude detection signal AMP contains almost no ripple, rotor position signals H1 to H3 are amplified without distortion, to generate signals V1 to V3 of constant amplitudes.

(Conclusion on the Third Embodiment)

By regulating the amplitudes of rotor position signals H1 to H3 using amplitude detection signal AMP generated by the amplitude detection circuit 18, signals V1 to V3 of constant amplitudes with almost no ripple are generated while maintaining sinusoidal waveforms, as in the first and second embodiments. Since amplitude detection signal AMP is generated without using a smoothing capacitor, high AGC responsiveness can be maintained as in the first and second embodiments.

Fourth Embodiment

A driving control apparatus of the fourth embodiment of the invention generates reference signals based on phases of rotor position signals, and drives each coil by PWM (pulse width modulation) using the reference signals. This driving control apparatus is described in detail below.

(Overall Construction)

Figure 9:
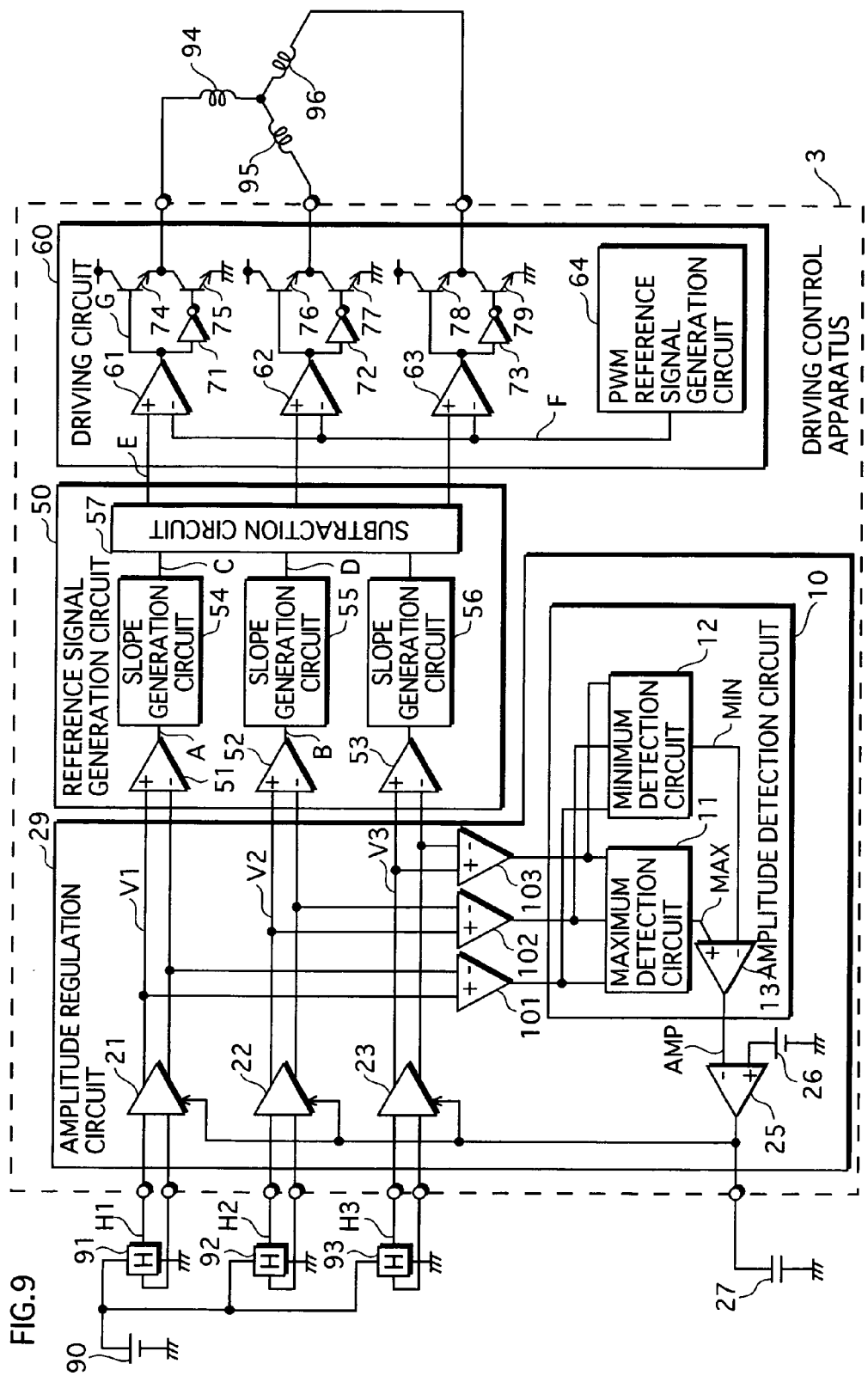
FIG. 9 is a functional block diagram showing a driving control apparatus in the fourth embodiment of the invention.

FIG. 9 is a functional block diagram showing an overall construction of a driving control apparatus 3 of the fourth embodiment. Construction elements which are the same as those in the driving control apparatus 1 of the first embodiment have been given the same reference numerals and their explanation has been omitted.

Figure 10:
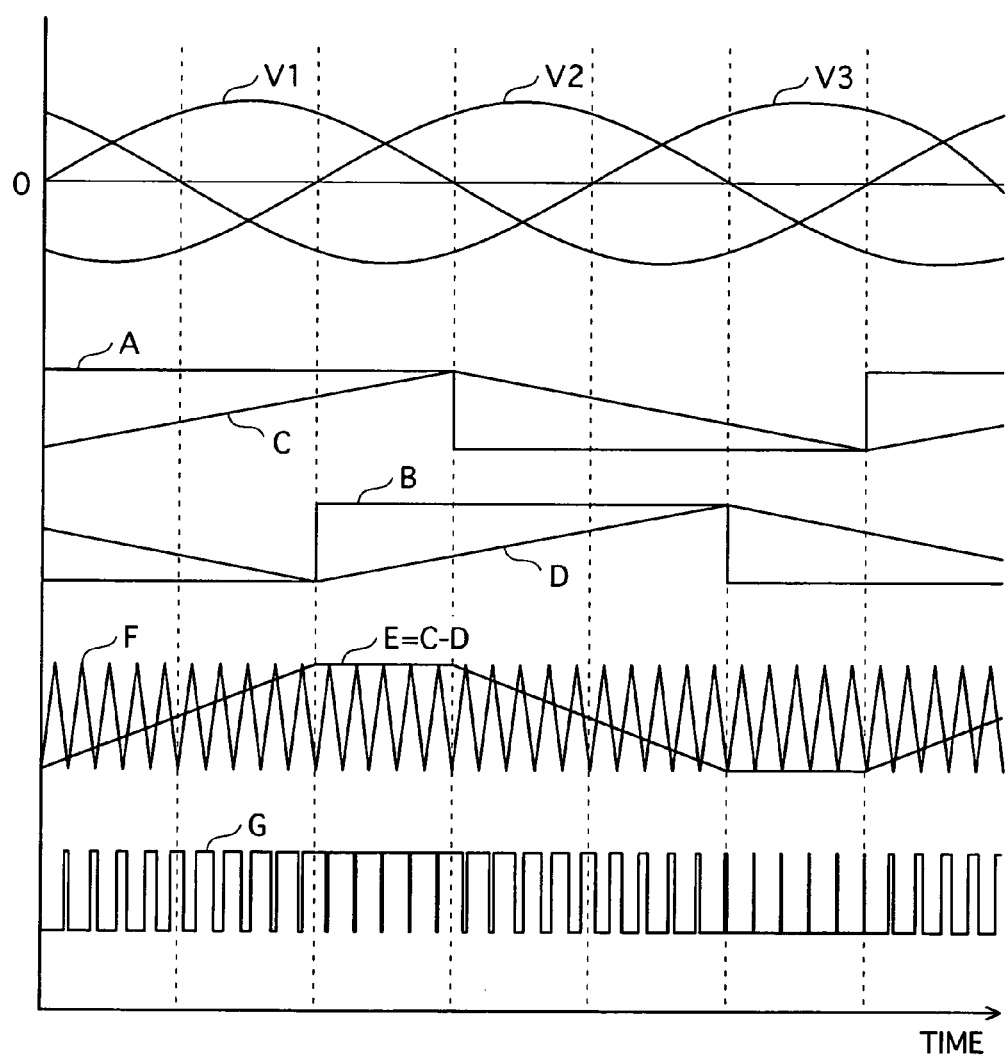
FIG. 10 shows waveforms of main signals in the driving control apparatus shown in FIG. 9.

FIG. 10 shows waveforms of main signals in the driving control apparatus 3.

An amplitude regulation circuit 29 differs from the amplitude regulation circuit 20 in that signals V1 to V3 after amplitude regulation are output in differential mode. The variable gain amplifiers 21 to 23 respectively output signals V1 to V3 obtained by regulating rotor position signals H1 to H3 at constant amplitudes, in differential mode. Signals V1 to V3 are input to the amplitude detection circuit 10 via differential amplifiers 101 to 103, respectively. Signals V1 to V3 are also input respectively to comparators 51 to 53 in a reference signal generation circuit 50, to judge a polarity of each of signals V1 to V3. Polarity judgment signals A and B corresponding to signals V1 and V2 are shown in FIG. 10 as an example. Phase information of each of signals V1 to V3 is obtained as a result of this polarity judgment.

Slope generation circuits 54 to 56 each generate a slope wave which increases when a polarity judgment signal output from a corresponding one of the comparators 51 to 53 shows a positive polarity and decreases when the polarity judgement signal shows a negative polarity. Slope waves C and D corresponding to polarity judgement signals A and B are shown in FIG. 10 as an example.

A subtraction circuit 57 generates a reference signal for each of the coils 94 to 96, by calculating a difference of two out of the three slope waves generated by the slope generation circuits 54 to 56. If the slope waves are triangular, the reference signal is trapezoidal. Reference signal E obtained by subtracting slope wave D from slope wave C is shown in FIG. 10 as an example.

In a driving circuit 60, a PWM reference signal generation circuit 64 generates PWM reference signal F. For example, PWM reference signal F has a triangular waveform or a sawtooth waveform. Power transistors 74 to 79 are switched according to comparison signals output from comparators 61 to 63 and inversion signals of the comparison signals output from inverters 71 to 73, and supply power to the coils 94 to 96. Comparison signal G output from the comparator 61 is shown in FIG. 10 as an example. Comparison signal G is HIGH when reference signal E is higher than PWM reference signal F. The comparators 62 and 63 output similar comparison signals of different phases, in the same way as the comparator 61.

(Conclusion on the Fourth Embodiment)

The amplitude regulation circuit 29 regulates rotor position signals H1 to H3 at constant amplitudes, in a wide range of motor rotation speeds. Especially, regulating rotor position signals H1 to H3 at constant amplitudes when the motor rotation speed is low has the following effects. The driving control apparatus 3 uses the amplitude regulation circuit 29 to keep the amplitudes of rotor position signals H1 to H3 constant without distorting their sinusoidal waveforms, even when the motor rotation speed is low. Hence polarity judgement can be made accurately. This allows the reference signal generation circuit 50 to generate accurate reference signals, with it being possible to drive the motor favorably.

Fifth Embodiment

A driving control apparatus of the fifth embodiment of the invention drives each coil by PWM, using rotor position signals after amplitude regulation as reference signals. This driving control apparatus is described in detail below.

(Overall Construction)

Figure 11:
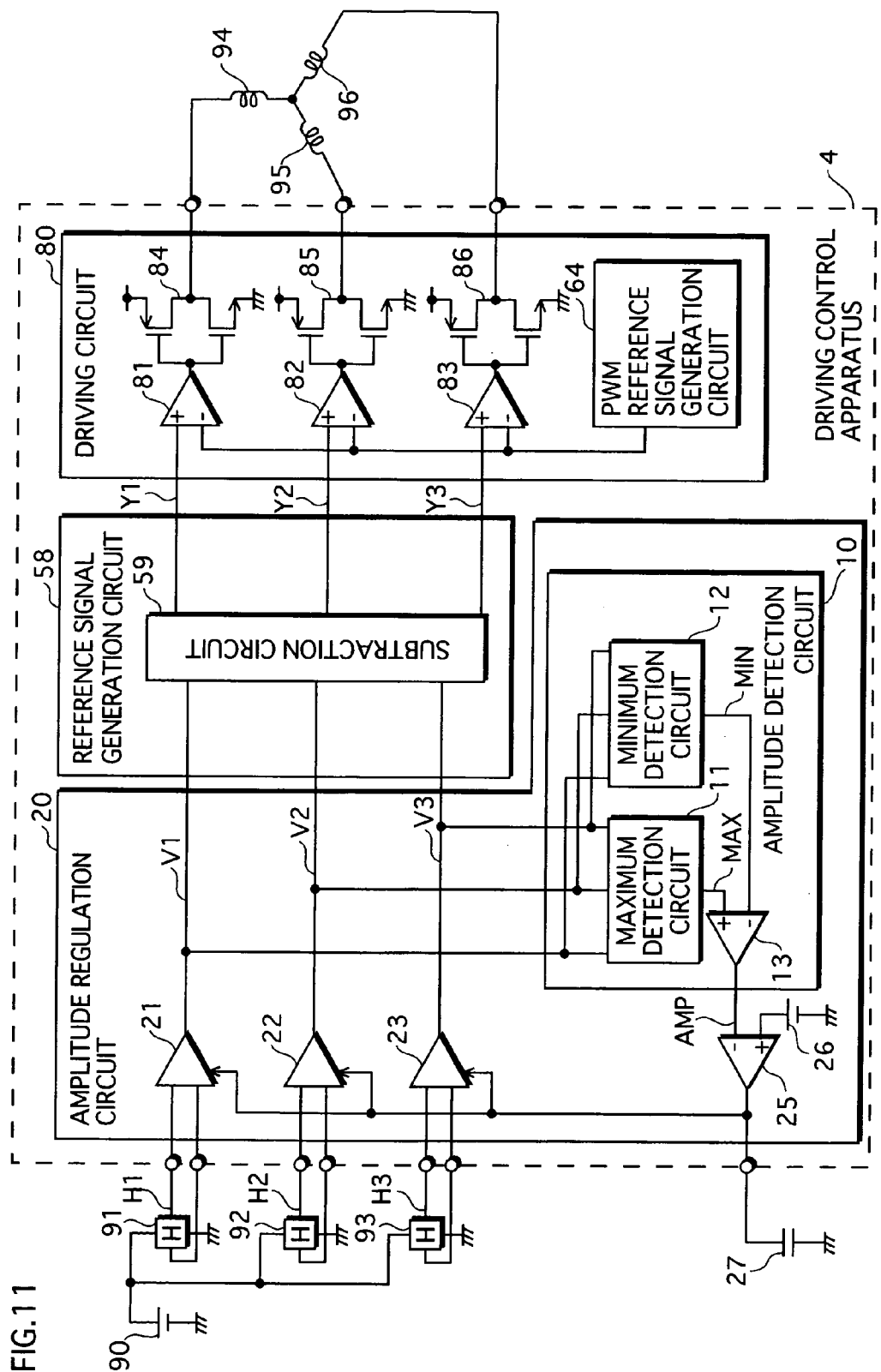
FIG. 11 is a functional block diagram showing a driving control apparatus in the fifth embodiment of the invention.
Figure 12:
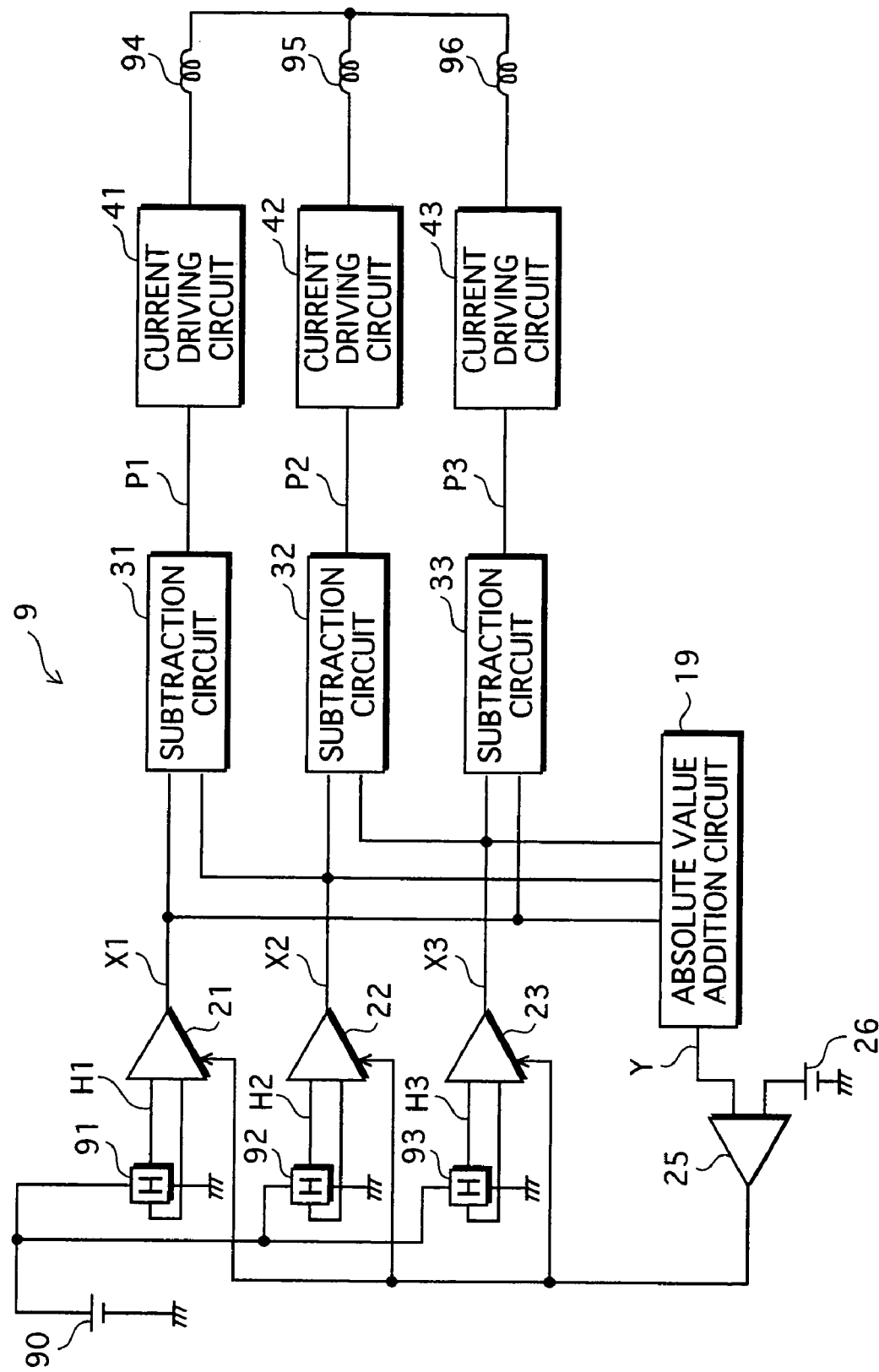
FIG. 12 is a functional block diagram showing a conventional driving control apparatus.
Figure 13A:
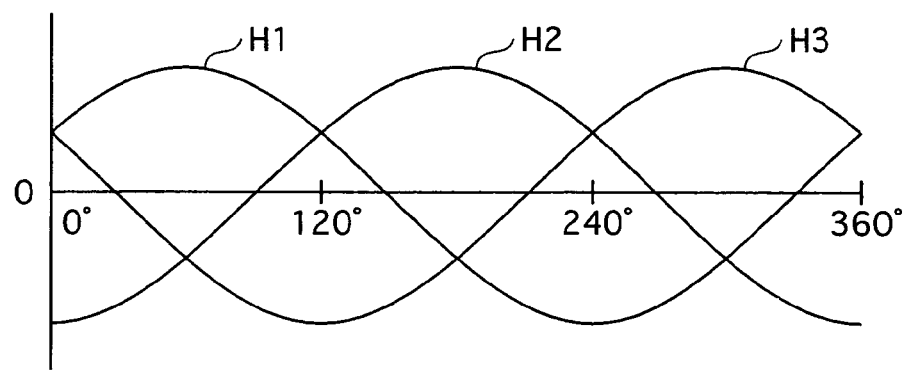
FIG. 13 shows waveforms of main signals in the conventional driving control apparatus shown in FIG. 12.
Figure 13B:
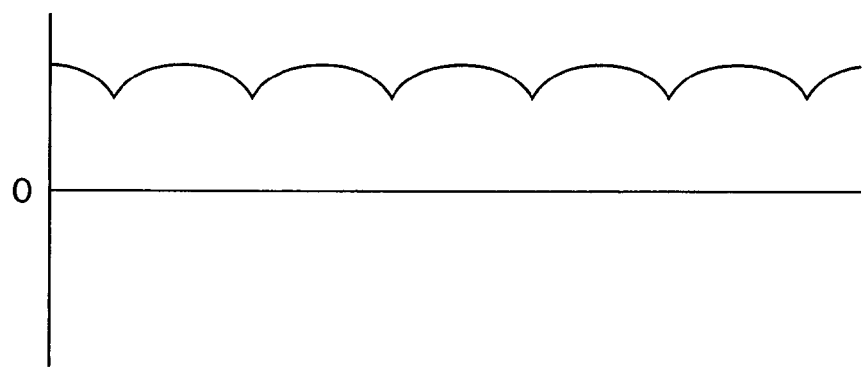
Figure 13C:
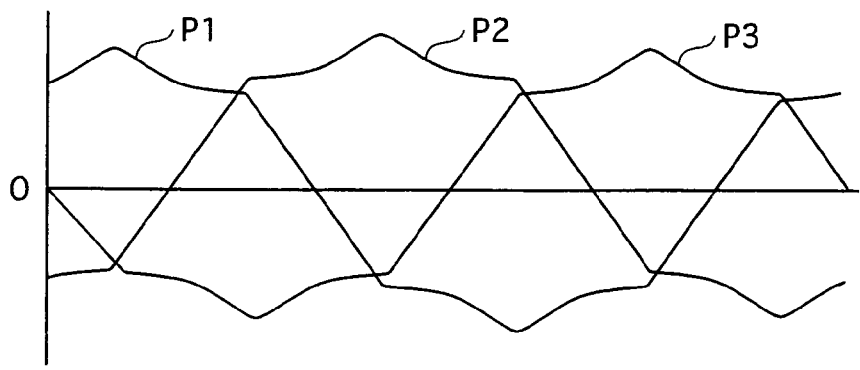

FIG. 11 is a functional block diagram showing an overall construction of a driving control apparatus 4 of the fifth embodiment. Construction elements which are the same as those in the driving control apparatuses 1 and 3 of the first and fourth embodiments have been given the same reference numerals and their explanation has been omitted.

In the amplitude regulation circuit 20, the comparator 25 outputs a control voltage which contains little alternating component, as explained earlier. The variable gain amplifiers 21 to 23 are controlled by AGC using such a control voltage, and as a result output signals V1 to V3 of constant amplitudes while maintaining sinusoidal waveforms.

A reference signal generation circuit 58 outputs reference signals Y1 to Y3 of sinusoidal waveforms obtained by shifting signals V1 to V3 in phase. The reference signal generation circuit 58 may be substantially equivalent to the reference signal generation circuit 30 shown in FIG. 1.

In a driving circuit 80, PWM comparators 81 to 83 each compare a triangular signal output from the PWM reference signal generation circuit 64 and a corresponding one of reference signals Y1 to Y3, and output a PWM signal whose pulse width is modulated according to the reference signal. CMOS inverters 84 to 86 are connected respectively with outputs of the PWM comparators 81 to 83, and drive the coils 94 to 96 by PWM.

(Conclusion on the Fifth Embodiment)

In the driving control apparatus 4, rotor position signals can be kept at constant amplitudes with little distortion even when the motor rotation speed is low, with there being no need to use a smoothing capacitor. This allows the coils to be driven according to accurate PWM signals, with it being possible to drive the motor stably without irregular rotations when the motor rotation speed is low.

Modifications

Although the present invention has been described by way of the above embodiments, the invention should not be limited to such. Example modifications are given below.

(1) The invention also applies to a computer program that realizes a method explained in each of the above embodiments using a computer system. Such a computer program may be distributed as a digital signal.

The invention may also be realized by a computer-readable storage medium, such as a flexible disk, a hard disk, a CD, an MO, a DVD, a BD, or a semiconductor memory, on which the computer program or digital signal mentioned above is recorded.

A computer program or digital signal that achieves the invention may also be transmitted via a network, such as an electronic communications network, a wired or wireless communications network, or the Internet.

The invention can also be realized by a computer system that includes a digital signal processor and a memory. In this case, the computer program mentioned above can be stored in the memory, with the digital signal processor operating in accordance with this computer program.

A computer program or digital signal that achieves the invention may be provided to an independent computer system by distributing a storage medium on which the computer program or digital signal is recorded or by transmitting the computer program or digital signal via a network. The independent computer system may then execute the computer program or digital signal to function as the invention.

(2) The amplitude regulation circuit of each of the above embodiments may be combined with other techniques relating to motor driving control apparatuses.

For instance, the amplitude regulation circuit may be combined with a technique of adjusting a motor torque. In this case, the current driving circuits 41 to 43 adjust amplitudes of difference signals output from the subtraction circuits 31 to 33 according to torque signals given from outside, and supply coil currents proportional to the adjusted difference signals.

Since the rotor position signals are amplified at constant amplitudes with little distortion as a result of amplitude regulation by the amplitude regulation circuit, accurate torque adjustment can be performed with a simple construction.

(3) The driving control apparatus of each of the above embodiments may be implemented on an IC (semiconductor integrated circuit). As an example, the driving control apparatus 3 enclosed by a dotted box in FIG. 9 may be implemented on an IC. In such a case, hollow circles on the dotted box represent input/output terminals of the IC.

The phase compensation capacitor 27 may be provided outside the IC as shown in FIG. 9, or inside the IC. Also, the power transistors 74 to 79 may be provided inside the IC as shown in FIG. 9, or outside the IC.

(4) The above embodiments describe the case where the amplitude regulation circuit is used to regulate amplitudes of rotor position signals of a three-phase brushless DC motor. It should be obvious, however, that the application of the amplitude regulation circuit is not limited to such.

For example, when calculating a power factor from a phase difference between a voltage and a current in a three-phase alternating-current power supply device where detection signals of the voltage and the current are both sinusoidal, the amplitude regulation circuit may be used to regulate these detection signals at constant amplitudes without distorting the sinusoidal waveforms.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A semiconductor integrated circuit device including a motor driving control apparatus which drives a brushless motor that includes coils corresponding to a plurality of phases based on Hall signals showing rotor positions, the motor diving control apparatus comprising:

an amplitude regulation circuit which (a) includes variable gain amplifiers that are operable to amplify the Hall signals in a one-to-one correspondence and output the amplified signals, and (b) is operable to regulate each of the Hall signals at a constant amplitude and output the regulated signals, by controlling a gain of each of the variable gain amplifiers based on a difference in level between an amplified signal having a highest level and an amplified signal having a lowest level out of the amplified signals;

a reference signal generation unit operable to generate a reference signal showing a voltage or current to be supplied to a coil corresponding to each of the plurality of phases, from the regulated signals; and a driving circuit operable to drive the coil corresponding to each of the plurality of phases based on the reference signal.

2. The semiconductor integrated circuit device of claim 1, wherein the driving circuit drives the coil corresponding to each of the plurality of phases, by outputting to the coil a PWM signal whose pulse width is modulated according to a waveform of the reference signal.

3. The semiconductor integrated circuit device of claim 2, wherein the amplitude regulation circuit includes:

the variable gain amplifiers corresponding one-to-one with the plurality of phases, each of the variable gain amplifiers being operable to amplify a Hall signal of a corresponding phase using a gain controlled by a control signal, and output the amplified signal;

a maximum detection unit operable to output a maximum signal, based on the amplified signal having the highest level out of the amplified signals which are output from the variable gain amplifiers;

a minimum detection unit operable to output a minimum signal, based on the amplified signal having the lowest level out of the amplified signals; and a control signal generation unit operable to output, to each of the variable gain amplifiers, a control signal for decreasing the gain when a difference between the maximum signal and the minimum signal is greater than a predetermined reference value, and a control signal for increasing the gain when the difference is no greater than the predetermined reference value.

4. The semiconductor integrated circuit device of claim 3, wherein the maximum detection unit includes:

a constant current source; and

NPN transistors corresponding one-to-one with the plurality of phases, each of the NPN transistors having a base in which an amplified signal output from a variable gain amplifier of a corresponding phase is input, and an emitter which is connected to the constant current source via an individual resistor, the maximum detection unit outputs the maximum signal from a connection point between the constant current source and resistors corresponding to the NPN transistors, the minimum detection unit includes:

a constant current source; and

PNP transistors corresponding one-to-one with the plurality of phases, each of the PNP transistors having a base in which an amplified signal output from a variable gain amplifier of a corresponding phase is input, and an emitter which is connected to the constant current source via an individual resistor, and the minimum detection unit outputs the minimum signal from a connection point between the constant current source and resistors corresponding to the PNP transistors.

5. The semiconductor integrated circuit device of claim 3, wherein the maximum detection unit includes:

a constant current source; and

N-channel MOSFETs corresponding one-to-one with the plurality of phases, each of the N-channel MOSFETs having a gate in which an amplified signal output from a variable gain amplifier of a corresponding phase is input, and a source which is connected to the constant current source, the maximum detection unit outputs the maximum signal from a connection point between the constant current source and sources of the N-channel MOSFETs, the minimum detection unit includes:

a constant current source; and

P-channel MOSFETs corresponding one-to-one with the plurality of phases, each of the P-channel MOSFETs having a gate in which an amplified signal output from a variable gain amplifier of a corresponding phase is input, and a source which is connected to the constant current source, and the minimum detection unit outputs the minimum signal from a connection point between the constant current source and sources of the P-channel MOSFETs.

6. The semiconductor integrated circuit device of claim 2, wherein the amplitude regulation circuit includes:

the variable gain amplifiers corresponding one-to-one with the plurality of phases, each of the variable gain amplifiers being operable to amplify a Hall signal of a corresponding phase using a gain controlled by a control signal, and output the amplified signal;

square units corresponding one-to-one with the plurality of phases, each of the square units being operable to square an amplified signal output from a variable gain amplifier of a corresponding phase, and output the squared signal;

an addition unit operable to calculate a sum of squared signals output from the square units, and output the sum as a square sum signal; and a control signal generation unit operable to output, to each of the variable gain amplifiers, a control signal for decreasing the gain when the square sum signal is greater than a predetermined reference value, and a control signal for increasing the gain when the square sum signal is no greater than the predetermined reference value.

7. The semiconductor integrated circuit device of claim 1, wherein the amplitude regulation circuit includes:

the variable gain amplifiers corresponding one-to-one with the plurality of phases, each of the variable gain amplifiers being operable to amplify a Hall signal of a corresponding phase using a gain controlled by a control signal, and output the amplified signal;

a maximum detection unit operable to output a maximum signal, based on the amplified signal having the highest level out of the amplified signals which are output from the variable gain amplifiers;

a minimum detection unit operable to output a minimum signal, based on the amplified signal having the lowest level out of the amplified signals; and a control signal generation unit operable to output, to each of the variable gain amplifiers, a control signal for decreasing the gain when a difference between the maximum signal and the minimum signal is greater than a predetermined reference value, and a control signal for increasing the gain when the difference is no greater than the predetermined reference value.

8. The semiconductor integrated circuit device of claim 7, wherein the maximum detection unit includes:

a constant current source; and

NPN transistors corresponding one-to-one with the plurality of phases, each of the NPN transistors having a base in which an amplified signal output from a variable gain amplifier of a corresponding phase is input, and an emitter which is connected to the constant current source via an individual resistor, the maximum detection unit outputs the maximum signal from a connection point between the constant current source and resistors corresponding to the NPN transistors, the minimum detection unit includes:

a constant current source; and

PNP transistors corresponding one-to-one with the plurality of phases, each of the PNP transistors having a base in which an amplified signal output from a variable gain amplifier of a corresponding phase is input, and an emitter which is connected to the constant current source via an individual resistor, and the minimum detection unit outputs the minimum signal from a connection point between the constant current source and resistors corresponding to the PNP transistors.

9. The semiconductor integrated circuit device of claim 7, wherein the maximum detection unit includes:

a constant current source; and

N-channel MOSFETs corresponding one-to-one with the plurality of phases, each of the N-channel MOSFETs having a gate in which an amplified signal output from a variable gain amplifier of a corresponding phase is input, and a source which is connected to the constant current source, the maximum detection unit outputs the maximum signal from a connection point between the constant current source and sources of the N-channel MOSFETs, the minimum detection unit includes:

a constant current source; and

P-channel MOSFETs corresponding one-to-one with the plurality of phases, each of the P-channel MOSFETs having a gate in which an amplified signal output from a variable gain amplifier of a corresponding phase is input, and a source which is connected to the constant current source, and the minimum detection unit outputs the minimum signal from a connection point between the constant current source and sources of the P-channel MOSFETs.

10. The semiconductor integrated circuit device of claim 1, wherein the amplitude regulation circuit includes:

the variable gain amplifiers corresponding one-to-one with the plurality of phases, each of the variable gain amplifiers being operable to amplify a Hall signal of a corresponding phase using a gain controlled by a control signal, and output the amplified signal;

square units corresponding one-to-one with the plurality of phases, each of the square units being operable to square an amplified signal output from a variable gain amplifier of a corresponding phase, and output the squared signal;

an addition unit operable to calculate a sum of squared signals output from the square units, and output the sum as a square sum signal; and a control signal generation unit operable to output, to each of the variable gain amplifiers, a control signal for decreasing the gain when the square sum signal is greater than a predetermined reference value, and a control signal for increasing the gain when the square sum signal is no greater than the predetermined reference value.

11. A semiconductor integrated circuit device including an amplitude regulation circuit which regulates a signal of each of a plurality of phases in a polyphase alternating signal at a constant amplitude, and outputs the regulated signal, the amplitude regulation circuit comprising:

variable gain amplifiers corresponding one-to-one with the plurality of phases, each of the variable gain amplifiers being operable to amplify a signal of a corresponding phase using a gain controlled by a control signal, and output the amplified signal;

a maximum detection unit operable to output a maximum signal, based on an amplified signal having a highest level out of amplified signals which are output from the variable gain amplifiers;

a minimum detection unit operable to output a minimum signal, based on an amplified signal having a lowest level out of the amplified signals; and a control signal generation unit operable to output, to each of the variable gain amplifiers, a control signal for decreasing the gain when a difference between the maximum signal and the minimum signal is greater than a predetermined reference value, and a control signal for increasing the gain when the difference is no greater than the predetermined reference value.

12. The semiconductor integrated circuit device of claim 11, wherein the maximum detection unit includes:

a constant current source; and

NPN transistors corresponding one-to-one with the plurality of phases, each of the NPN transistors having a base in which an amplified signal output from a variable gain amplifier of a corresponding phase is input, and an emitter which is connected to the constant current source via an individual resistor, the maximum detection unit outputs the maximum signal from a connection point between the constant current source and resistors corresponding to the NPN transistors, the minimum detection unit includes:

a constant current source; and

PNP transistors corresponding one-to-one with the plurality of phases, each of the PNP transistors having a base in which an amplified signal output from a variable gain amplifier of a corresponding phase is input, and an emitter which is connected to the constant current source via an individual resistor, and the minimum detection unit outputs the minimum signal from a connection point between the constant current source and resistors corresponding to the PNP transistors.

13. The semiconductor integrated circuit device of claim 11, wherein the maximum detection unit includes:

a constant current source; and

N-channel MOSFETs corresponding one-to-one with the plurality of phases, each of the N-channel MOSFETs having a gate in which an amplified signal output from a variable gain amplifier of a corresponding phase is input, and a source which is connected to the constant current source, the maximum detection unit outputs the maximum signal from a connection point between the constant current source and sources of the N-channel MOSFETs, the minimum detection unit includes:

a constant current source; and

P-channel MOSFETs corresponding one-to-one with the plurality of phases, each of the P-channel MOSFETs having a gate in which an amplified signal output from a variable gain amplifier of a corresponding phase is input, and a source which is connected to the constant current source, and the minimum detection unit outputs the minimum signal from a connection point between the constant current source and sources of the P-channel MOSFETs.

14. A semiconductor integrated circuit device including an amplitude regulation circuit which regulates a signal of each of a plurality of phases in a polyphase alternating signal at a constant amplitude, and outputs the regulated signal, the amplitude regulation circuit comprising:

variable gain amplifiers corresponding one-to-one with the plurality of phases, each of the variable gain amplifiers being operable to amplify a signal of a corresponding phase using a gain controlled by a control signal, and output the amplified signal;

square units corresponding one-to-one with the plurality of phases, each of the square units being operable to square an amplified signal output from a variable gain amplifier of a corresponding phase, and output the squared signal;

an addition unit operable to calculate a sum of squared signals output from the square units, and output the sum as a square sum signal; and a control signal generation unit operable to output, to each of the variable gain amplifiers, a control signal for decreasing the gain when the square sum signal is greater than a predetermined reference value, and a control signal for increasing the gain when the square sum signal is no greater than the predetermined reference value.

* * * * *